United States Patent [19]
Kirk

[11] 3,798,740
[45] Mar. 26, 1974

[54] METHOD OF EXTRUDING A POROUS COMPACTED MASS OF METAL POWDER HAVING A SEALED OUTER SURFACE

[75] Inventor: Frederick Arthur Kirk, Rotherham, England

[73] Assignee: Davy-Ashmore Limited, London, England

[22] Filed: Oct. 2, 1972

[21] Appl. No.: 294,352

[52] U.S. Cl.......... 29/420.5, 29/527.4, 29/DIG. 31, 29/DIG. 47
[51] Int. Cl................................................ B22f 3/24
[58] Field of Search......... 29/420.5, 527.4, DIG. 31, 29/DIG. 47

[56] References Cited
UNITED STATES PATENTS

| | | | |
|---|---|---|---|
| 2,932,882 | 4/1960 | Kelly | 29/420 |
| 3,076,916 | 2/1963 | Koppius | 29/420.5 UX |
| 3,390,985 | 7/1968 | Croeni | 29/DIG. 31 |
| 3,648,343 | 3/1972 | Haller | 29/420.5 X |
| 3,689,964 | 9/1972 | Reen | 29/420.5 |

FOREIGN PATENTS OR APPLICATIONS

| | | | |
|---|---|---|---|
| 812,819 | 4/1959 | Great Britain | 29/DIG. 47 |

Primary Examiner—Charles W. Lanham
Assistant Examiner—D. C. Reiley, III

[57] ABSTRACT

In an extrusion process a mass of metal particles is subjected to pressure, e.g., isostatic pressure in order to compact the powder but to less than fully dense condition. The outer surface of the compact so formed is sealed with a material conveniently glass and the compact is then heated and extruded under pressure through a die. As alternatives to the use of glass as the sealing material salt, or a fine powder of a ductile metal may be used.

12 Claims, 11 Drawing Figures

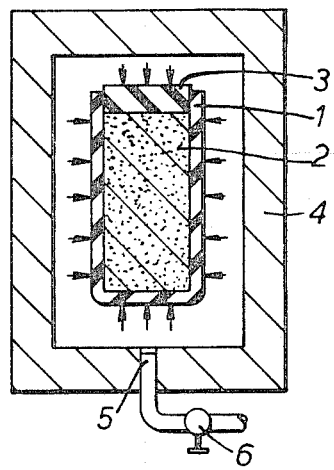
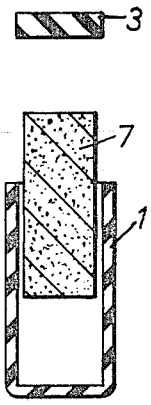
FIG. IA
FIG. IB
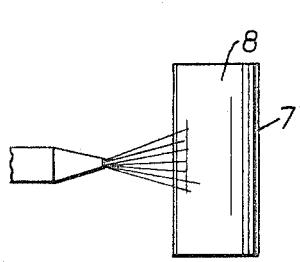
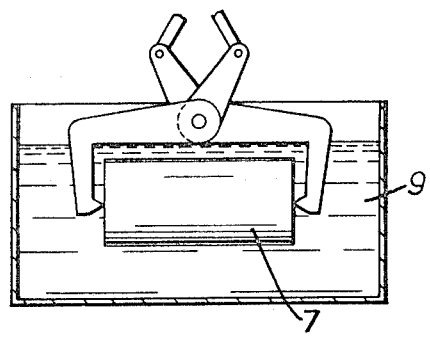
FIG. IC
FIG. ID
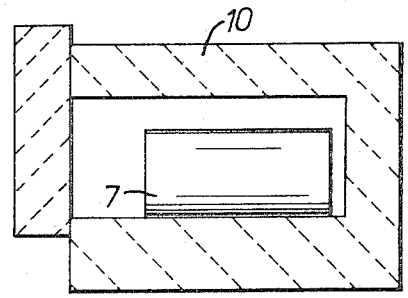
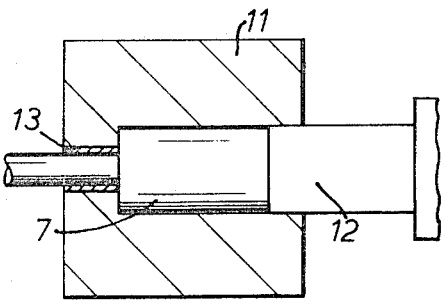
FIG. IE
FIG. IF

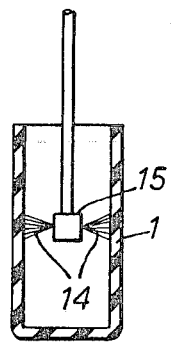
FIG. 2A
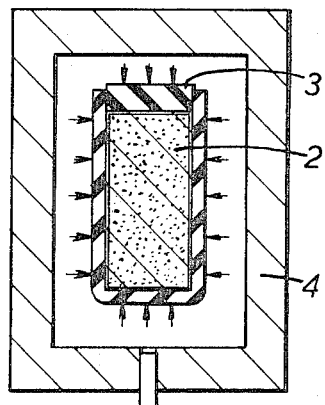 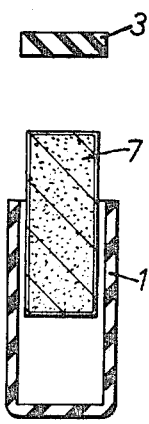
FIG. 2B     FIG. 2C
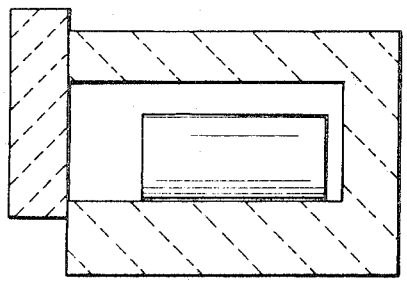 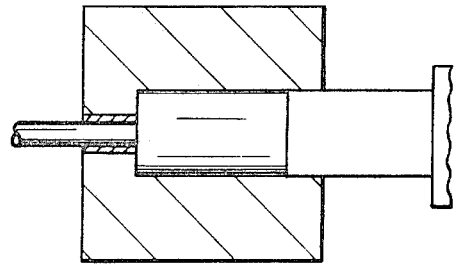
FIG. 2D     FIG. 2E

METHOD OF EXTRUDING A POROUS COMPACTED MASS OF METAL POWDER HAVING A SEALED OUTER SURFACE

This invention relates to an extrusion process, i.e., a process in which articles are extruded from billets of metal, "metal" in this context being understood to include alloys.

An object of this invention is to enable metal extrusions to be made, starting from metal powder.

According to the present invention, in an extrusion process a mass of metal powder is subjected to pressure in order to compact the powder but to less than fully dense condition and the compact so formed, is extruded, whilst having its outer surface sealed, under pressure and at an elevated temperature through a die.

The sealed outer surface of the compact prevents ingress of air to the porous compact material and resulting compact degradation.

The sealing material may be salt, the compact being inserted in a bath of molten salt, or a fine powder of a ductile metal, but it is preferably glass. The compact may be immersed in a bath of molten glass to form a glass envelope round the compact and to preheat the compact prior to extrusion; but, instead, the compact may be given a glass coating, as by spraying, in such a manner as to insulate the compact from atmospheric oxygen during final heating prior to extrusion.

The metal powder, when subjected to pressures of the order attainable in industrially acceptable equipment, e.g. 30,000 to 100,000 p.s.i., achieves a degree of mechanical bonding which may be augmented by some chemical bonding dependent on the powder surface oxygen content, the metallurgical content and pressure exerted; the density of the compacted powder is not however that of the theoretical fully dense condition and as a result the compact has substantial porosity. The degradation of the material of the compact, which would accompany any heating or hot working of the compact unless carried out in a controlled non-oxidising atmosphere, is avoided by sealing the outer surface of the compact, since the compact is then cut off from air during heating. When glass is used as the surface sealant it also acts as a lubricant for the extrusion process.

The compaction of the metal powder is preferably effected by filling a bag of rubber or other elastomeric material with the powder, sealing the bag and inserting it in a pressure vessel where it is subjected to fluid pressure. The pressure applied is within the pressure levels achievable in industrially acceptable equipment. At these pressure levels, steel powder is compacted to a density of about 70 – 80 percent of the theoretical fully dense value.

The compact is then covered with preferably a glass coating, either by spraying or immersion, and placed in a furnace with a controlled atmosphere, as of hydrogen or an inert gas, at the required temperature to allow the glass to sinter out and to seal completely the compact surface. As a result, the included gas of the compact contains a minimum of compact degrading oxygen; if the sealing step is not taken, the porous compact contains included air which causes excessive oxidation, during subsequent heating. In an alternative arrangement, the glass envelope may be provided by spraying a glass slip onto the inner surface of the walls of the bag prior to introducing the powder into the bag.

The sealed compact is next transferred to the final heating zone to bring the temperature of the compact up to extrusion temperature.

In order that the invention may be more readily understood it will now be described, by way of example only, with reference to the accompanying drawings which show diagrammatically successive stages of the process according to two embodiments of the invention.

Referring now to FIG. 1A, a bag 1 of rubber or other elastomeric material is filled with metal powder 2 and a sealing bung 3 is used to close off the bag. The bag is generally cylindrical in form with a cross-sectional diameter of, say, 3 – 15 inches and a length of, say, 4 – 40 inches. The bag and its contents are placed in an isostatic chamber 4 and subjected to a cold isostatic compaction process by fluid under pressure introduced into the chamber through an inlet 5 controlled by a valve 6. In the chamber the powder is subjected to a pressure of preferably 30,000 to 60,000 p.s.i. and is formed into a compact of about 70 – 80 percent of the theoretical fully dense value. After the completion of the compaction process the compact 7 is removed from the bag 1 as shown in FIG. 1B.

The outer surface of the compact is immediately sealed by a deposited layer of glass.

The layer of glass 8 may be provided by spraying a glass slip onto the surface of the compact as shown in FIG. 1C or alternatively the compact 7 may be lowered into a bath 9 of molten glass (FIG. 1D).

When an immersion process is employed the glass is one having a softening temperature of approximately 1,000° C, such glasses being known for the extrusion of steel billets. When the glass is sprayed onto the compact, the glass may comprise a mixture of two different glass powders in a liquid vehicle, the powders preferably having a particle size of less than 100 microns. One of the powders is a normal extrusion glass having a softening point of about 1,000° C and the other is a glass having a softening point of between 400°–500° C. The second glass softens as its temperature is raised to approximately 400°–500° C and thereafter reacts with the other glass to maintain a high viscosity.

The compact with its envelope has to be heated to extrusion temperature and to this end the compact and envelope are located in an oven 10 as shown in FIG. 1E. The oven has a non-oxidising atmosphere of hydrogen or inert gas. After the compact has been allowed to reach its extrusion temperature it is transferred, with its glass envelope, to the container 11 of an extrusion press (FIG. 1F) and a plunger 12 enters the container and extrudes the compact material through a die 13. A glass pad (not shown) may be placed in the container of the press between the die and the compact before the extrusion process commences.

In the alternative embodiment of the invention, the rubber bag 1 has a coating 14 of a glass slip sprayed onto its inner surface from a spray nozzle 15 as shown in FIG. 2A. The glass slip is the same as the mixture of two glasses in a liquid vehicle which is described above with reference to FIG. 1C. The bag and its contents are subjected to a cold isostatic compaction process as shown in FIG. 2B. On completion of the process the compact material having a coating of glass is removed from the bag as shown in FIG. 2C. The compact is then heated and extruded in the manner illustrated in FIGS. 2D and 2E and described above with reference to FIGS. 1E and 1F.

As an alternative to the use of glass as a sealant a fine powder of a ductile metal may be used. The metal is preferably the same as the body of the compact but having a particle size of say one third of that of the particles making up the body.

I claim:

1. In an extrusion process wherein a mass of metal powder is subjected to pressure in order to compact the powder but to less than fully dense condition, the improvement comprising sealing the outer surface of the compact so formed by depositing thereon a layer of glass prior to extruding the sealed compact under pressure and at an elevated temperature through a die.

2. An extrusion process as claimed in claim 1 in which the powder is compacted by placing the powder in a closed bag of rubber or other elastomeric material and subjecting the powder within the bag to pressure in a cold isostatic compaction process.

3. An extrusion process as claimed in claim 1 in which the glass is sprayed onto the compact.

4. An extrusion process as claimed in claim 1 in which the glass is formed on the compact by dipping the compact into a softened glass.

5. An extrusion process as claimed in claim 2 in which a glass slip is sprayed onto the internal surface of the bag before the metal powder is introduced into the bag, the glass slip serving as the sealant of the powder when compacted.

6. An extrusion process as claimed in claim 5 in which the glass slip comprises a mixture of two different powdered glasses in a liquid vehicle.

7. In an extrusion process wherein a mass of metal powder is subjected to pressure in order to compact the powder but to less than fully dense condition, the improvement comprising sealing the outer surface of the compact so formed by depositing thereon a layer of sealant material prior to heating the compact and extruding it under pressure and at an elevated temperature through a die.

8. An extrusion process as claimed in claim 7 in which the outer surface of the compact is sealed by a fine powder of a ductile metal.

9. An extrusion process comprising subjecting a mass of metal powder to pressure sufficient to compact the powder to less than fully dense condition, depositing a layer of sealant material on the outer surface of the resulting compact, heating the compact with the sealant layer thereon, and then extruding the compact under pressure and at an elevated temperature through a die.

10. An extrusion process as claimed in claim 9 in which the powder is compacted by placing the powder in a closed bag of rubber or other elastomeric material and subjecting the powder within the bag to pressure in a cold isostatic compaction process.

11. An extrusion process as claimed in claim 9 in which the sealant is a layer of glass deposited on the compact.

12. An extrusion process as claimed in claim 1 in which the glass comprises a mixture of two different powdered glasses in a liquid vehicle.

* * * * *